United States Patent Office 2,903,151
Patented Sept. 8, 1959

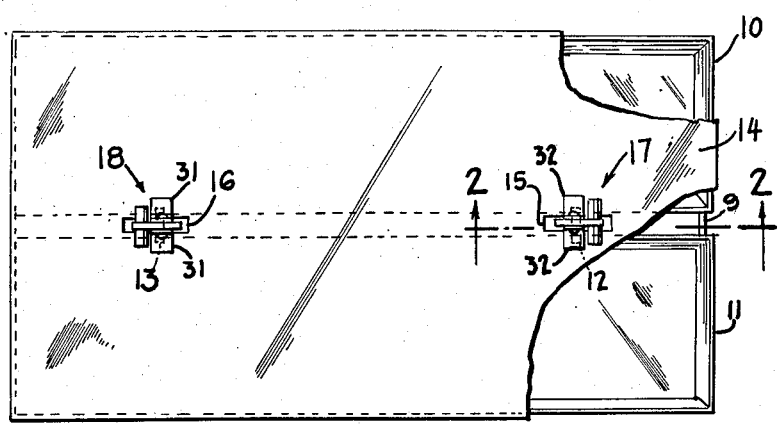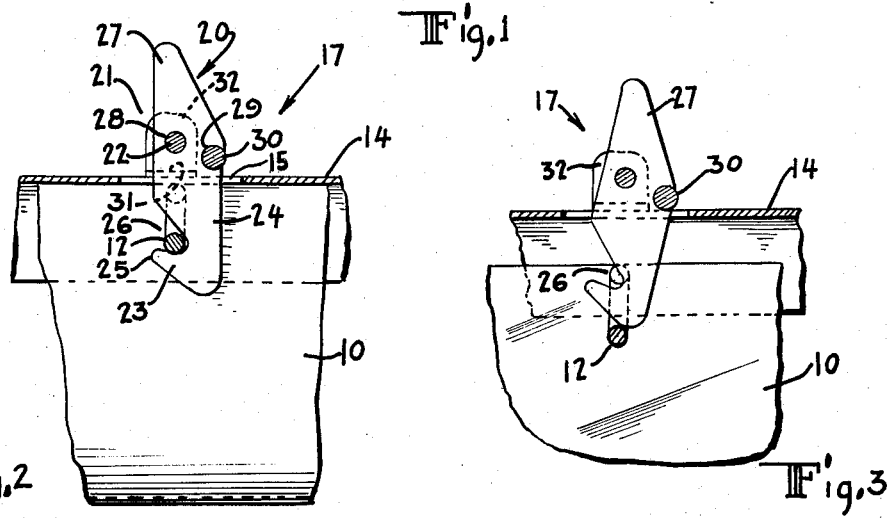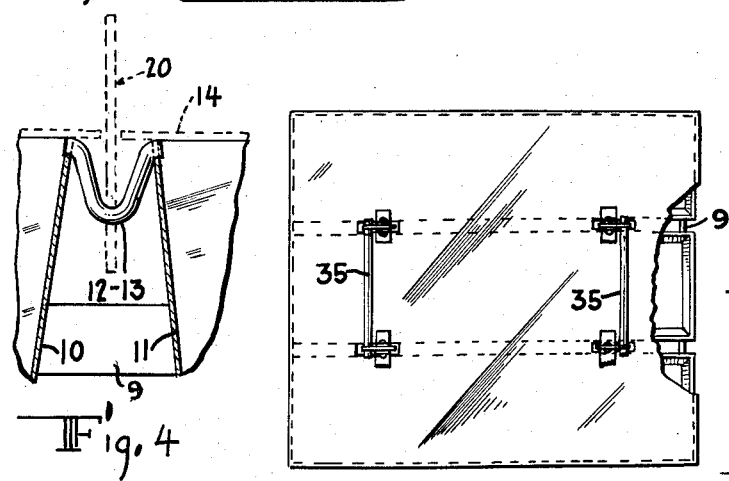

2,903,151

MEANS FOR ATTACHING BAKING PAN COVERS TO BAKING PANS

Anthony Alcaro, Jersey City, N.J.

Application November 25, 1957, Serial No. 698,578

18 Claims. (Cl. 220—23.2)

The present invention relates to baking pans of a commercial type which require to be covered during the baking of the product therein, and, more particularly to improved means for attaching the covers to the pans.

The present invention is primarily concerned with covers which are placed on a baking pan unit comprising two or more parallel pans and transverse members secured to the pans at the upper edges thereof to arrange the same as a unit, although certain features of this invention may be applicable to covers for other types of pans.

Accordingly, an object of the present invention is to provide means for attaching covers to such baking pans which are simple, practical and economical in construction and are readily operated with a minimum of manual effort.

Another object is to provide such means which securely lock the covers but are readily released when it is desired to remove the covers.

Another object is to provide such means which cooperate with elements already existing on multiple baking pan units.

A further object is to provide such means which can be readily installed on newly fabricated covers, and can also be installed on covers in service by slight modification of the covers and/or the pans on which the covers are used.

Other and further objects of the invention will be obvious upon an understanding of the illustrative embodiment about to be described, or will be indicated in the appended claims, and various advantages not referred to herein will occur to one skilled in the art upon employment of the invention in practice.

In the drawing:

Fig. 1 is a plan view of one form of multiple baking pan unit and a cover having means thereon for attaching the same to the pan unit.

Fig. 2 is an enlarged sectional view taken along the line 2—2 on Fig. 1, illustrating a latch arm in accordance with the present invention in its cover securing position.

Fig. 3 is a view similar to Fig. 2, illustrating the latch arm just prior to moving into its cover securing position.

Fig. 4 is a fragmentary sectional view illustrating one of the strips between the pans.

Fig. 5 is a plan view similar to Fig. 1, illustrating another form of multiple baking pan unit and a cover having modified means thereon for attaching the same to the pan unit.

Referring in detail to Figs. 1 to 4 of the drawing there is shown a multiple baking pan unit comprising a pair of parallel slightly spaced apart pans 10 and 11 which are held in assembly by a band 9 surrounding and attached to the ends and outer sides of the pans in the conventional manner, a pair of downwardly bowed transverse rigid rods or strips 12 and 13 secured to the upper edges of the pans to hold them in spaced apart position, a cover 14 for the pan unit having lengthwise spaced apart longitudinal openings or slots 15 and 16 adjacently above the strips 12 and 13, respectively, and in vertical alignment with the space between the pans, and means 17 and 18 on the cover constructed and arranged for cooperation with the strips 12 and 13 and the openings 15 and 16, respectively, for attaching the cover to the pan unit.

In Fig. 2, only the means 17 are shown in detail, because the means 18 are identical therewith in construction but only differ in arrangement as will be described hereinafter.

Generally described, the means 17 and 18 each comprise a latch element 20, a bracket 21 secured to the cover and a pin 22 or the like for pivotally mounting the latch element on the bracket for movement in a lengthwise extending vertical plane.

The latch element 20 may be a flat metal stamping which comprises a lower latch arm 24 including a nose 25 and a slot or notch 26 at one side above the nose providing a finger 23, an upper operating arm portion 27, and an aperture 28 for receiving the pivot pin 22 which is offset from the center of gravity towards the left (as viewed) so that the latch element will tend to swing in a clockwise direction (as viewed) for the purpose described hereinafter.

If desired, the latch element may be formed with a notch 29 at the side opposite the slot 26 and just below the level of the aperture 28 for receiving and securing therein a weighting element such as a short length of metal rod 30 which further unbalances the latch element to cause the same to swing in the clockwise direction. Since the rod 30 extends transversely across the slot 15 in the cover, it will engage the upper surface of the cover to serve as a stop for limiting the swinging movement of the latch member.

The bracket 21 is an angle piece comprising a base 31 secured to the cover 14 at one side of the slot 15 therein, and an upright portion 32 formed with an aperture for receiving the pivot pin 22.

As shown in Fig. 2, the latch arm 24 extends through the slot 15 in the cover, and the slot 26 in the latch arm receives the strip 12 with the finger 23 extending under the strip to lock the cover in place. The latch element of the cover attaching means 18 is similarly positioned but is arranged so that the slot or notch 26 thereof faces in the opposite direction, whereby both latch elements can be readily released by engaging the operating arms 27 with the right and left hands respectively and bringing the hands together to rotate the latch elements into a tilted position to cause the fingers 23 to release the strips 12 and 13. Preferably, the slots 26 face inwardly with respect to the cover, but could face outwardly if desired, whereby the latch elements are operated to release the cover by moving the hands apart.

In Fig. 3, the attaching means 17 is shown just as the cover is being placed on the pan unit. The latch element 20 now is swung out of its vertical position with the rod 30 engaging the upper surface of the cover to limit the extent of swinging movement, and the nose 25 contacts the upper surface of the strip 12. As the cover is lowered onto the pan unit, the nose 25 serves as a cam to swing the latch element in a counterclockwise direction (as viewed), so that when the finger 23 clears the strip 12, the latch element by reason of its unbalance swings in a clockwise direction (as viewed) whereby the strip enters the slot 26 and the finger 23 extends under the strip (Fig. 2).

In Fig. 5, cover attaching means are shown for a pan unit having more than two pans, for example three. The elements of this arrangement are identical to the embodiment described in connection with Figs. 1 to 3, except that the rods 30 are replaced by a rod 35 which has its ends secured in the notches 29 of two latch elements 20 in transverse alignment. The rods 35, like the rods 30, serve as weighting means to swing the latch elements into locking position and serve as stops to limit the extent of such movement, whereby the noses are positioned for cooperation with the strips. The cover is readily released and removed by manually engaging the rods 35 and moving them together or apart depending on how the slots 26 are arranged, and then using the rods 35 as handles to lift the cover from the pan unit.

In the event the pan unit has four pans, a pair of three latch elements in transverse alignment are provided with the rods 35 each secured to three latch elements.

While the present invention has been described by way of illustration in connection with multiple pan units, it can be utilized in connection with a single pan having strips secured to the upper ends thereof which cooperate with the latch elements.

From the foregoing description, it will be seen that the present invention provides improved cover attaching means for baking pans and the like which lock the cover on the pan automatically simply by dropping or lowering the cover in place on the pan and which are readily released when it is desired to remove the cover. The elements of the attaching means are simple and economical in construction, do not materially increase the weight of the cover, and can readily withstand such rough usage to which they may normally be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In combination, a plurality of parallel spaced apart baking pans, a pair of lengthwise spaced members secured to adjacent pans and extending transversely across the space therebetween, a cover for said pan unit having a pair of openings therein each adjacent one of said members, and a pair of latch elements pivotally mounted on said cover each having a latch arm extending through one of said openings and formed with a notch for receiving one of said members and with a finger for engaging one of said members, said notches facing in opposite directions and each latch element having a portion extending upwardly from said cover operable in opposite directions to cause said latch arms to disengage said members.

2. Structure according to claim 1, wherein said members extend downwardly and latch elements are so located that said latch arms engage said member at substantially the midpoint between said pans.

3. Structure according to claim 1, wherein said latch arms each have a nose for engaging said members to position said latch arm notches for receiving said members.

4. Structure according to claim 3, wherein said latch elements are so pivotally mounted at a point spaced from the center of gravity thereof that said latch elements tend to swing in a direction to cause said notches to receive said members.

5. Structure according to claim 4, wherein each of said elements has stop means thereon for engaging said cover to limit the extent of swinging movement thereof and to position said noses to engage said members.

6. Structure according to claim 3, wherein each of said elements are weighted to swing in a direction to cause said notches to receive said members.

7. Structure according to claim 6, wherein said elements are weighted by stop means for engaging said cover to limit the extent of swinging movement thereof and to position said noses to engage said members.

8. Structure according to claim 1, including at least three pans and at least two pairs of openings and latch elements with corresponding latch elements of each pair in transverse alignment, and a rod connecting the corresponding elements of each pair for simultaneous movement.

9. Structure according to claim 8, wherein said latch arms each have a nose for engaging said members to position said latch arm notches for receiving said members, said rods serve to weight said latch elements to swing in a direction to cause said notches to receive said members, and said rods engage said cover to serve as stops to limit the extent of swinging movement of said latch elements and to position said noses to engage said members.

10. Structure according to claim 9, wherein said notches of all of the latch elements connected by a common rod face in the same direction.

11. A baking pan cover comprising a cover member, a pair of lengthwise spaced openings therein, and a pair of latch elements mounted on said cover member for pivotal movement in a lengthwise extending plane each including a latch arm formed with a notch and a nose and extending through one of said openings and having a portion extending upwardly from said cover for manually operating said latch elements, said notches facing in opposite lengthwise directions.

12. A baking pan cover according to claim 11, wherein said latch elements are constructed and arranged to swing out of a vertical position in the direction in which its notch faces.

13. A baking pan cover according to claim 12, wherein latch elements have stop means for engaging said cover member to limit the extent of swinging movement thereof.

14. A baking pan cover according to claim 11, including at least two pairs of openings and latch elements with corresponding latch elements in transverse alignment, and a rod connecting the corresponding elements of each pair for simultaneous movement.

15. A baking pan cover according to claim 14, wherein said rods serve to weight said latch elements to swing out of vertical position in the direction in which the notches thereof face, and said rods engage said cover member to serve as stops to limit the extent of swinging movement of said latch elements.

16. A baking pancover according to claim 15, wherein said notches of each pair of latch elements face in opposite directions.

17. An assembly for attaching a baking pan cover to a pan, said assembly comprising at least two brackets adapted for securement to the cover, a latch element pivotally mounted on each of said brackets for movement in parallel planes and each including a depending latch arm formed with a nose and a notch above said nose and each including an upwardly extending portion, and a rod connecting said upwardly extending portions to effect a simultaneous movement of said latch element and to serve as a handle.

18. An assembly according to claim 17, wherein said rods are constructed and arranged to swing said latch elements out of a vertical position in the direction in which said notches face and serving as a stop to limit the extent of swinging movement.

References Cited in the file of this patent

UNITED STATES PATENTS

| | | |
|---|---|---|
| 1,050,449 | Gillespie | Jan. 14, 1913 |
| 1,631,734 | Katzinger | June 7, 1927 |
| 2,217,097 | Brooks | Oct. 8, 1940 |

FOREIGN PATENTS

| | | |
|---|---|---|
| 733,247 | Germany | Mar. 22, 1943 |